United States Patent
Knight et al.

(10) Patent No.: US 10,606,532 B1
(45) Date of Patent: Mar. 31, 2020

(54) SYSTEMS AND METHODS FOR GENERATING PRINTABLE MAPS

(71) Applicant: MappedIn Inc., Waterloo (CA)

(72) Inventors: Sarah Knight, Kitchener (CA); Nicholas Jessop, Stratford (CA); Bradley James Harris, Kitchener (CA); Erkang Wei, Waterloo (CA); James Nathan Swidersky, Kitchener (CA); George Aleksander Plukov, Richmond Hill (CA)

(73) Assignee: MappedIn Inc., Waterloo (CA)

( * ) Notice: Subject to any disclaimer, the term of this patent is extended or adjusted under 35 U.S.C. 154(b) by 0 days.

(21) Appl. No.: 16/369,432

(22) Filed: Mar. 29, 2019

Related U.S. Application Data

(60) Provisional application No. 62/649,882, filed on Mar. 29, 2018.

(51) Int. Cl.
*G06F 3/12* (2006.01)

(52) U.S. Cl.
CPC .......... *G06F 3/1242* (2013.01); *G06F 3/1204* (2013.01); *G06F 3/1208* (2013.01); *G06F 3/1246* (2013.01); *G06F 3/1248* (2013.01); *G06F 3/1255* (2013.01); *G06F 3/1256* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 8,122,341 B1 * | 2/2012 | Dayan | G06Q 10/101 715/230 |
| 2012/0143878 A1 * | 6/2012 | Fendley | G01C 21/32 707/748 |
| 2014/0156186 A1 * | 6/2014 | Liu | G01C 21/206 701/533 |

* cited by examiner

*Primary Examiner* — Thomas D Lee
(74) *Attorney, Agent, or Firm* — Own Innovation; James W. Hinton

(57) ABSTRACT

Provided is a system and a method for generating a printable map of a facility. The method includes receiving a request sent by a device at a print server, retrieving electronic wayfinding data by the print server, generating an initial printable map based on the electronic wayfinding data, displaying the initial printable map on the device, receiving one or more customizations entered on the device by a user, and updating the initial printable map to include the one or more customizations.

30 Claims, 13 Drawing Sheets

FIG. 12

SYSTEMS AND METHODS FOR GENERATING PRINTABLE MAPS

TECHNICAL FIELD

The embodiments disclosed herein relate to systems and methods for generating printable maps.

INTRODUCTION

Recent advancements in technology have transformed the ways in which people orient themselves and navigate from place to place, i.e., wayfinding. For instance, technologies such as global positioning system (GPS)-enabled user devices and map applications on mobile devices have made outdoor wayfinding more convenient and accurate.

Despite advancements in technology related to wayfinding within a facility, i.e., facility wayfinding, many individuals navigating such facilities still rely on hardcopies of facility maps. In some cases, GPS is not viable for wayfinding. Individuals may not have access to map and/or wayfinding applications on a user device. Furthermore, individuals simply may not want to access such map and/or wayfinding application on their user device. As a result, facilities still maintain and provide printed, hardcopy facility maps. However, maintaining hardcopy facility maps can be expensive and time-consuming.

SUMMARY

To help enable system users to create, edit and maintain the printable maps, a wayfinding system may provide one or more map editing tools or frameworks. The map editing tools may be part of the wayfinding system, and may be accessed, for example, via portal management module or in any other suitable way. The map editing tool may be configured to help a system user, to generate a printable map from electronic wayfinding data, such as the electronic facility maps, facility metadata, facility units, obstructions, connections, regions and the like, that can be used in the operation of the wayfinding system. The map editing tool may have any suitable configuration that can help guide and/or assist system users in creating their desired printable maps in a useful and relatively quick manner, while still being relatively easy to use and allowing a system user a relatively high degree of autonomy and design freedom in customizing the printable map. The map editing tool may be configured to track changes in the electronic wayfinding data between printable map generations.

Provided is a system for generating a printable map of a facility. The system includes a print service module having a plurality of wayfinding data; a database for storing the plurality of wayfinding data; a worker module for generating an initial printable map based on the plurality of wayfinding data; and a storage for storing the initial printable map, wherein the storage is connected to the worker module.

The system may provide the initial printable map to a device. The device includes a web browser for downloading the initial printable map from the storage and an editing tool for editing the initial printable map to generate a final printable map, wherein the editing tool receives the initial printable map downloaded by the web browser.

The system may further include a printer for printing the final printable map.

The final printable map may include any one or more of the facility, a directory listing of a plurality of facility units in the facility, a legend listing features shown on the final printable map, a plurality of unit identifiers, wherein each identifier corresponds to one facility unit in the facility, a plurality of visual indicators, wherein each visual indicator corresponds to one section of the facility, a plurality of amenity identifiers, wherein each amenity identifier corresponds to one amenity in the facility, a descriptor of the facility, and at least one route.

The plurality of wayfinding data may include at least one facility map of the facility and a plurality of facility metadata.

The plurality of facility metadata may include a plurality of polygons, wherein each polygon corresponds to one object in the facility, the plurality of polygons including any one or more of: a subset of unit polygons, wherein each unit polygon defines the boundary of one facility unit in the facility; a subset of section polygons, wherein each section polygon defines the boundary of one section in the facility; and a subset of obstruction polygons, wherein each obstruction polygon defines the boundary of one obstruction in the facility.

The plurality of facility metadata may include a plurality of nodes, wherein each node corresponds to one location in the facility, the plurality of nodes including any one or more of: a subset of unit nodes, wherein each unit node defines the location of one facility unit in the facility; a subset of amenity nodes, wherein each amenity node defines the location of one amenity in the facility; a subset of section nodes, wherein each section node defines the location of one section in the facility; a subset of obstruction nodes, wherein each obstruction node defines the location of one obstruction in the facility; a subset of connection nodes, wherein each connection node defines the location of one connection in the facility; and a subset of region nodes, wherein each region node defines the location of one region in the facility.

The plurality of facility metadata may include a plurality of identifiers, wherein each identifier corresponds to one object in the facility, the plurality of identifiers including any one or more of: a subset of unit identifiers, wherein each unit identifier corresponds to one facility unit in the facility; a subset of amenity identifiers, wherein each amenity identifier corresponds to one amenity in the facility; a subset of section identifiers, wherein each section identifier corresponds to one section in the facility; a subset of connection identifiers, wherein each connection identifier corresponds to one connection in the facility; and a subset of region identifiers, wherein each region identifier corresponds to one region in the facility.

The initial printable map may be generated as a plurality of data files. The plurality of data files may include a Portable Document Format (PDF) file, wherein the PDF file contains a vector map of the facility; a Scalable Vector Graphics (SVG) file, wherein the SVG file contains graphical representations of the plurality of identifiers; and an Extendable Markup Language (XML) file, wherein the XML file contains textual representations of the plurality of identifiers.

Provided is a method for generating a printable map of a facility. The method includes receiving a request sent by a device at a print server, retrieving electronic wayfinding data by the print server, generating an initial printable map based on the electronic wayfinding data, displaying the initial printable map on the device, receiving one or more customizations entered on the device by a user, and updating the initial printable map to include the one or more customizations.

The electronic wayfinding data may include at least one facility map of the facility and a plurality of facility metadata.

The one or more customizations may include annotating a plurality of identifiers, wherein the plurality of identifiers is a subset of the electronic wayfinding data.

The method may further include saving the initial printable map as a plurality of files.

The plurality of files may include a Portable Document Format (PDF) file, wherein the PDF file contains a vector map of the facility; a Scalable Vector Graphics (SVG) file, wherein the SVG file contains graphical representations of a plurality of identifiers; and an Extendable Markup Language (XML) file, wherein the XML file contains textual representations of the plurality of identifiers.

Generating an initial pintable map based on the electronic wayfinding data may include assigning print categories to a plurality of facility units, wherein each facility unit is assigned to one print category as selected by the user for each facility unit, assigning sections to the plurality of facility units, wherein each facility unit is assigned to one section according to the location of the facility unit within the facility and selecting electronic map layers to include in the initial printable map, wherein each electronic map layer corresponds to a subset of objects in the facility.

The method may further include adding identifiers to objects contained in the selected electronic map layers in the initial printable map, adding icons to the initial printable map, wherein each icon corresponds to one object of the subset of objects.

The method may further include rotating the initial printable map in response to receiving a desired orientation.

Print categories may be pre-assigned groupings of facility units according to the nature of the facility units.

The method may further include associating print categories with venue categories, wherein each print category is associated with a pre-assigned venue category; and alerting the user when the venue category does not have a pre-assigned mapping to a print category.

The venue categories may be pre-assigned groupings of facility units according to the nature of the facility units.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 12 is another example screen shot of a map editing tool, in accordance with some embodiments.

DETAILED DESCRIPTION

Figure 1:
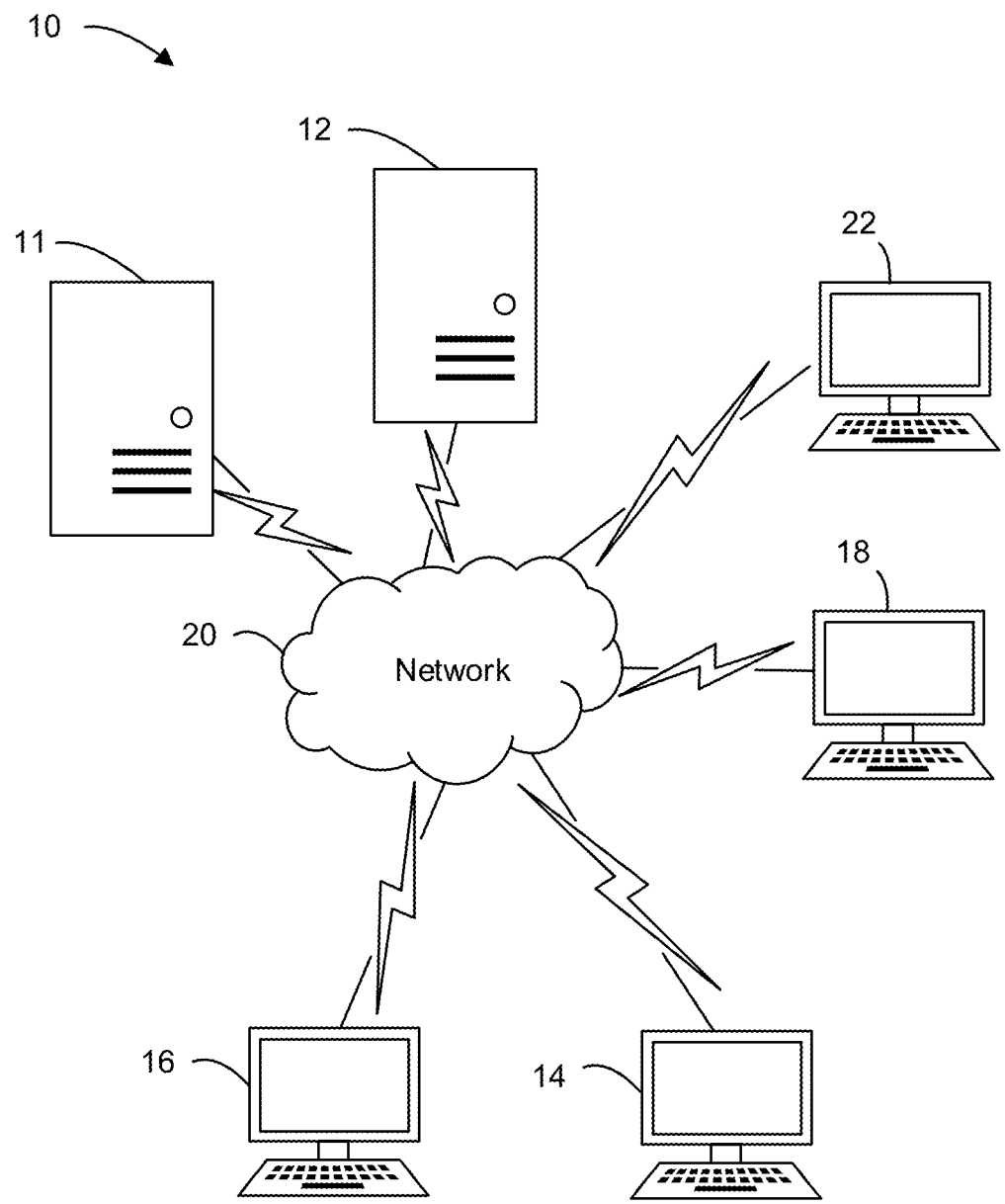
FIG. 1 is a diagram of a wayfinding system, in accordance with some embodiments.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention. Further, the communication between several components may be asynchronous.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

While advancements have been made in technology relating to wayfinding within a facility, i.e., facility wayfinding, many facilities continue to maintain facility maps that can be printed as a hardcopy for physical distribution.

Maintenance of printable facility maps can involve a coordinated effort by multiple teams within the facility's organization including but not limited to a drafting team, a marketing team, a design team, and a print shop. The drafting team can be responsible for maintaining an accurate drawing of the facility, such as a computer-aided design (CAD) drawing. The marketing team can be responsible for tracking physical changes within the facility. The design team can be responsible for the look and feel of the final product, that is, the hardcopy map. The print shop can be responsible for printing the map onto a hardcopy paper format.

The process of producing a hardcopy map typically begins with a CAD drawing of the facility from the drafting team. The marketing team can mark-up on the CAD drawing to indicate changes to the physical facility. Examples of changes to the physical facility include but is not limited to new wings, new partitioning walls, facility unit changes (i.e., incoming facility units, outgoing facility units, and relocation of facility units within the facility). The marketing team can provide the marked-up CAD drawing to the design team.

The design team can take the CAD drawing, makes changes to an existing copy of the printable map, which is typically in Adobe Illustrator®, and applies sections to the map. The design team can add information that may be helpful to a user viewing the printable map. For example, the design team can add store identifiers, amenity icons, and any other appropriate information. The design team can also update the store directory, which includes adding, deleting, or updating store entries, as well as manually matching up what section identifiers to apply to the output. This is typically done in Adobe InDesign®. The design team can generate multiple versions of the printable map by rotating the map into different orientations. For each orientation, map annotations, such as identifiers, icons, etc., may need to be manually adjusted. The design team can send the modified map back to the marketing team for review. This process is reiterated numerous times. Once the printable map is finally generated, it can be sent to the print shop for printing.

The process of producing a printed, hardcopy map can take months to complete because it can be very manual and thus labor intensive. By the time the process is complete and a printed, hardcopy map is produced, it can be out of date already and the process is restarted again.

A system and method that can readily generate a printable map can be advantageous. In particular, reducing the amount of manual work and the back and forth review process can be desirable.

FIG. 1 shows a block diagram illustrating one exemplary embodiment of a wayfinding system 10 for indoor mapping. The wayfinding system 10 is for a facility including multiple objects (i.e., a facility wayfinding system). The wayfinding system 10 is not restricted to a single facility, but may be extended to multiple facilities of the same type and/or different types, each including multiple objects. Examples of objects that may be included in a given facility can include facility units, amenities, obstructions, connections, regions and the like. For the purposes of this description, facility units may be configured as stores, rooms and other types of identifiable, generally bounded structures that may form a part of a larger facility.

For example, stores within a shopping center, offices within a commercial office building, classrooms within a school, patient rooms within a hospital, bathrooms inside other structures and the like. Obstructions may be objects that are generally not traversable by end users of the wayfinding system 10 and that may impede navigation throughout the facility. Examples of obstructions can include tables, benches, shelves, beds, other furniture, fountains, sculptures and other objects that are placed within a facility or facility unit but typically do not form part of the structure of the facility or facility unit. Connections may be portions of a facility or facility unit that extend between, and connect, two or more traversable areas within the wayfinding system 10. Examples of connections may include hallways, walkways, staircases, elevators, escalators, ramps, moving walkways and the like. Regions may be regions of the facility and/or a facility unit that are generally open, at least partially traversable areas that are not bounded by walls. Examples of regions can include, atriums, foyers, event spaces, stages, open floor area in a store, concourses, public squares, courtyards and the like.

The wayfinding system 10 allows users, (e.g., visitors to the facility), to orient themselves and to navigate from place to place within the facility, enabling them to find what they are looking for and to discover things around them. For example, a shopper at a mall can use the wayfinding system 10 to search for a particular store or a particular item or class of items (e.g., shoes), navigate to the relevant location, and/or look at the current promotions.

The facility may be any type of facility, and may include a single building or two or more separate buildings, each of which may include any suitable facility units and other objects. Typically, the facility is a commercial facility or an institutional facility. For example, the facility may be a retail facility, (e.g., a mall or a shopping center), an office facility, (e.g., an office building), an event facility, (e.g., a conference center, an amusement park, or a theme park), a transportation facility, (e.g., an airport, or a bus terminal), an educational facility, (e.g., a school or a university campus), or a medical facility, (e.g., a hospital). The facility may be an indoor, an outdoor facility and/or may include a combination of indoor and outdoor portions. However, the wayfinding systems described herein may be particularly useful for indoor facilities and/or facilities with at least some indoor portions.

The facility units in a given facility may be any type of suitable facility units. For example, the facility units may be commonly managed as part of the facility. Some examples of facility units include stores, restaurants, booths, offices, rooms, halls, washrooms, airport gates, and/or locations or areas within the facility. A given facility may include only a single type of facility units, or alternatively a facility may include a mixture of different types of facility units.

The wayfinding system 10 may include a facility wayfinding system, such as those described in United States Patent Application Publication Number 2014/0156186, application Ser. No. 13/852,304, which is hereby incorporated by reference in its entirety.

In the illustrated example, the wayfinding system 10 includes a server platform 12 which communicates with a plurality of store devices 14, a plurality of facility devices 16, and a plurality of administrator devices 18 via a communication network 20. The server platform 12 also communicates with a plurality of visitor devices 22. The store devices 14, facility devices 16, administrator devices 18, and visitor devices 22 are herein collectively referred to as "user devices". The server platform 12 may be a purpose built machine designed specifically for implementing a system and method for indoor mapping.

The server platform 12, store devices 14, facility devices 16, administrator devices 18 and visitor devices 22 may be a server computer, desktop computer, notebook computer, tablet, PDA, smartphone, or another computing device. The server platform 12 and user devices 14, 16, 18, and 22 may include a connection with the communication network 20 such as a wired or wireless connection to the Internet. In some cases, the communication network 20 may include other types of computer or telecommunication networks. The server platform 12 and user devices 14, 16, 18, and 22 may include one or more of a memory, a secondary storage device, a storage unit, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor of each of the server platform 12 and user devices 14, 16, 18, and 22 may execute applications, computer readable instructions or programs. The applications, computer readable instructions or programs may be stored in memory or in secondary storage, or may be received from the Internet or other communication network 20. Input device may include any device for entering information into server platform 12 and user devices 14, 16, 18, and 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, server platform 12 and user devices 14, 16, 18, and 22 may include multiple of any one or more of processors, applications, software modules, second storage devices, network connections, input devices, output devices, and display devices.

Although server platform 12 and user devices 14, 16, 18, and 22 are described with various components, one skilled in the art will appreciate that the server platform 12 and user devices 14, 16, 18, and 22 may in some cases contain fewer, additional or different components. In addition, although aspects of an implementation of the server platform 12 and user devices 14, 16, 18, and 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the server platform 12 and user devices 14, 16, 18, and 22 and/or processor to perform a particular method.

In the description that follows, the server platform 12, and user devices 14, 16, 18, and 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the user devices 14, 16, 18, and 22 may send information to and receive information from the server platform 12. For example, a store user using the store device 14 may manipulate one or more input devices (e.g. a mouse and a keyboard) to interact with a user interface displayed on a display of the store device 14 to respond to questions. Generally, the device may receive a user interface from the communication network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of store devices 14, facility devices 16, administrator devices 18, and visitor devices 22. Generally, the information may comprise at least an identifier identifying the user who may be associated with a store, associated with a facility, an administrator of the system, or visitor of the store or facility. For example, the information may comprise one or more of a username, e-mail address, password, or social media handle.

In response to receiving information, the server platform 12 may store the information in a storage database. The storage database may correspond with secondary storage of the server platform 12 or the user device 14, 16, 18, and 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a communication network 20 for example. In some cases, the storage database may comprise one or more storage devices located at a networked cloud storage provider.

The store device 14 may be associated with a store account. Similarly, the facility device 16 may be associated with a facility account, the administrator device 18 may be associated with an administrator account, and the visitor device 22 may be associated with a visitor account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

The user devices 14, 16, 18, and 22 and the server platform 12 may communicate asynchronously, for example, by using an implementation of the WebSocket protocol, such as Socket.IO. Updates may be sent from the server platform 12 to each of the user devices 14, 16, 18, and 22 in real time as interrupts, i.e., without polling. Likewise, user interaction data may be sent from each of the user devices 14, 16, 18, and 22 to the server platform 12 in real time as interrupts, i.e., without polling.

Figure 2:
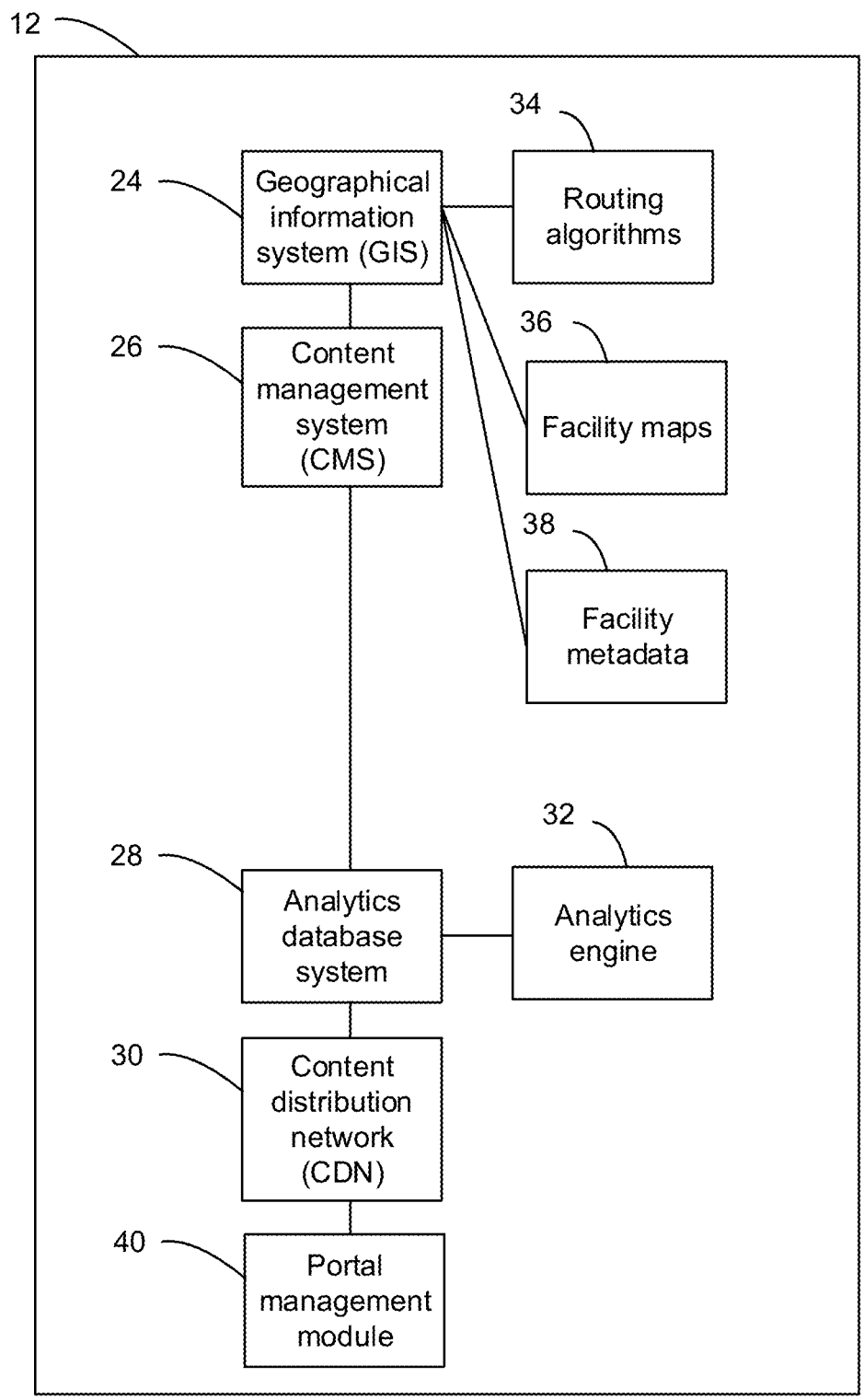
FIG. 2 is block diagram of a server platform of the wayfinding system of FIG. 1.

Turning now to FIG. 2, illustrated therein is the server platform 12, in accordance with an embodiment. The server platform 12 includes a content management system (CMS)

26, an analytics database system 28, and a geographical information system (GIS) 24. The server platform 12 may include multiple backend devices, e.g., servers. The server platform 12 may include at least a database server and a hosting server. In some instances, the server platform 12 also includes a content distribution network (CDN) 30. The CMS 26 and the analytics database system 28 may be hosted by the server platform 12. The GIS 24 may be hosted internally by the server platform 12 or supplied externally.

In some embodiments, the CMS 26 may be a frontend interface application, typically, implemented as a web service. CMS 26 may communicate with GIS 24, which then modifies the database server. In this case, GIS 24 may be an Application Program Interface (API) which manipulates the database server.

In some embodiments, CMS 26 stores content, including information relating to the facility and the facility units, handles updates to the content received from the user devices 14, 16, 18, and 22, and provides content to the user devices 14, 16, 18, and 22. For example, the CMS 26 may be a no structured query language (NoSQL) database application. The content stored in the CMS 26 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units may be tied to a related entry in the facility metadata 38 stored in the GIS 24. This may allow larger, less frequently accessed files to be stored in the CMS 26, rather than the GIS 24.

In some embodiments, the analytics database system 28 includes or is operatively connected to an analytics engine 32. The analytics database system 28 may be a database application, typically implemented as a web service. The analytics database system 28 stores all user interactions, e.g., user selections or "hits", searches, dates, types of user device 14, 16, 18 and 22, and/or movement patterns represented as heat maps, in real time, and generates analytics relating to the user interactions. Advantageously, because user interactions are recorded for several different user devices 14, 16, 18, and 22, a relatively large sample size is obtained. The large sample size may allow analytics engine 32 to plot heat maps that are useful for users and to provide suggestions to improve user experience.

The GIS 24 is, typically, a representational state transfer (REST)-ful application programming interface (API). The GIS 24 includes routing algorithms 34, electronic facility maps 36, and associated facility metadata 38. The GIS 24 may store the electronic facility maps 36 and the facility metadata 38, handle updates to the electronic facility maps 36 and the facility metadata 38, and provide the electronic facility maps 36 and the facility metadata 38 to the user devices 14, 16, 18, and 22. Typically, the GIS 24 serves the electronic facility maps 36, e.g., as PNG files, and the facility metadata 38, e.g., as JSON/XML files, over the web. The facility metadata 38 is customizable for the type of facility, and may include digital representations of paths, polygons encapsulating facility units, nodes corresponding to facility locations, identifiers for each facility unit, and qualitative metadata, such as the type of path, e.g., hallway or dirt trail. Optionally, information about the objects utilized for a given system (i.e. all of the objects that are used to define a given facility, etc.) can be stored in the server platform in an object library that can be a separate module on the server platform 12, or may be incorporated within the electronic facility maps 36 module, facility metadata module 38 or any other suitable location.

The GIS 24 also uses the routing algorithms 34 to calculate routes and provides the routes to the user devices 14, 16, 18, and 22. Typically, the routing calculations output a JSON/XML list of node or polygon identifiers representing a complete path, which the user devices 14, 16, 18, and 22 will interpret and display. The output may also include points of interest and other metadata 38, such as total estimated travel time based on type of path and real-time traffic, as described herein.

The visitor devices 22 may be efficiently managed and run both online and offline. The visitor devices 22 may create a simple navigation tool that engages visitors as they seek out more information about the facility. Each interface may be carefully designed with a focus on the user experience. Designs can be adapted to each facility's brand and specific needs, providing a unique interface with no disruption to the user experience. The visitor devices 22 may be configured to provide a smooth, intelligent personal indoor mapping experience. Visitors can access directions and facility information from anywhere in the facility. Alternatively or additionally, visitors can plan routes prior to arriving and contact a location by phone or via social media directly from their personalized profile.

The server platform 12 may include a portal management module 40 for managing the wayfinding system 10. The store device 14, the facility device 16, and the administrator device 18 communicate with the portal management module 40 to create and modify facility related data.

With portal management module 40, all building data may optionally be generated or modified using one tool via, for example, a web browser. The portal management module 40 may include collaborative tools with secure user accounts and permissions. In some embodiments, each user may be assigned a role with appropriate security credentials, such as an administrator (administrator device 18), a facility manager (facility device 16), and a store manager (store device 14). The administrator device 18 may have higher security clearance in terms of accessing and updating data, and modifying settings. The facility device 16 may be configured to change facility and store descriptions, logos and so on, but may not have permission to alter maps, etc. The store device 14 can modify or alter data relating to the store account that it is associated with. Additional rules may be enforced if desired. For example, users of store devices may only access and/or change certain data pertaining to certain stores, and so on.

For example, a facility editor may log into portal 40 make edits to an electronic facility map 36 and save the electronic facility map 36 at different stages. The unfinished electronic facility map 36 may be saved in draft mode, where the facility editor may not have permission to publish the updated map until approved by administrator or facility owner from the administrator device 18 or the facility device 16, and the wayfinding system 10 may be configured to track approvals.

In some embodiments, the wayfinding system 10 may be created, edited and maintained substantially completed by one or more trained system administrators. In such examples, the system administrator may create the electronic facility maps 36 (including the plurality of facility units and other objects within a given facility) and the facility metadata 38. A system administrator can be trained to create the electronic facility maps 36, facility units and other types of system data in an organized manner and/or in accordance with a set of prescribed practices to help ensure that the resulting data is consistent, is compatible with existing data, and in particular is valuable such that it can be used for mapping and wayfinding functions. This may help ensure that the system data is accurate and valuable, but may be somewhat cumbersome when the wayfinding system 10 is in use. For example, a trained system administrator may not be readily available each time the electronic facility maps 36 or metadata 38 require updating.

Alternatively, a system user, such as the owner and/or operator of a given facility that is represented in the wayfinding system 10, may wish to have a certain degree of autonomy and the ability to create, edit and maintain the electronic facility maps 36 and facility metadata 38 without requiring the input, and potentially cost, of a system administrator.

Optionally, to help enable system users to create, edit and maintain the electronic facility maps 36 and facility metadata 38 in a useful and correct manner, the wayfinding system 10 may provide one or more map editing tools or frameworks. The map editing tools may be part of the wayfinding system 10, and may be accessed, for example, via the portal management module 40 or in any other suitable way. For example, if not part of the portal management module 40 the wayfinding system 10, and/or the server platform 12 may include a separate map editing module.

The map editing tool may preferably be configured to help a system user, with little to no design and/or programming experience, to create, edit, and maintain data, such as the electronic facility maps 36, facility metadata 38, facility units, obstructions, connections, regions and the like, that can be used in the operation of the wayfinding system 10. The map editing tool may have any suitable configuration that can help guide and/or assist system users in creating their desired data in a useful manner, while still being relatively easy to use and allowing a system user a relatively high degree of autonomy and design freedom with respect to the electronic facility maps 36 and facility metadata 38 (as well as any other applicable portions of the wayfinding system 10 and server platform 12, such as the routing algorithms 34, etc.).

The map editing tool can also be configured to cause the wayfinding system 10 to generate a printable map from the electronic wayfinding data, such as the electronic facility maps 36 and facility metadata 38 including facility units, obstructions, connections, regions, and the like. That is, the wayfinding system 10 can retrieve the electronic wayfinding data and generate printable map files using this data.

Figure 3:
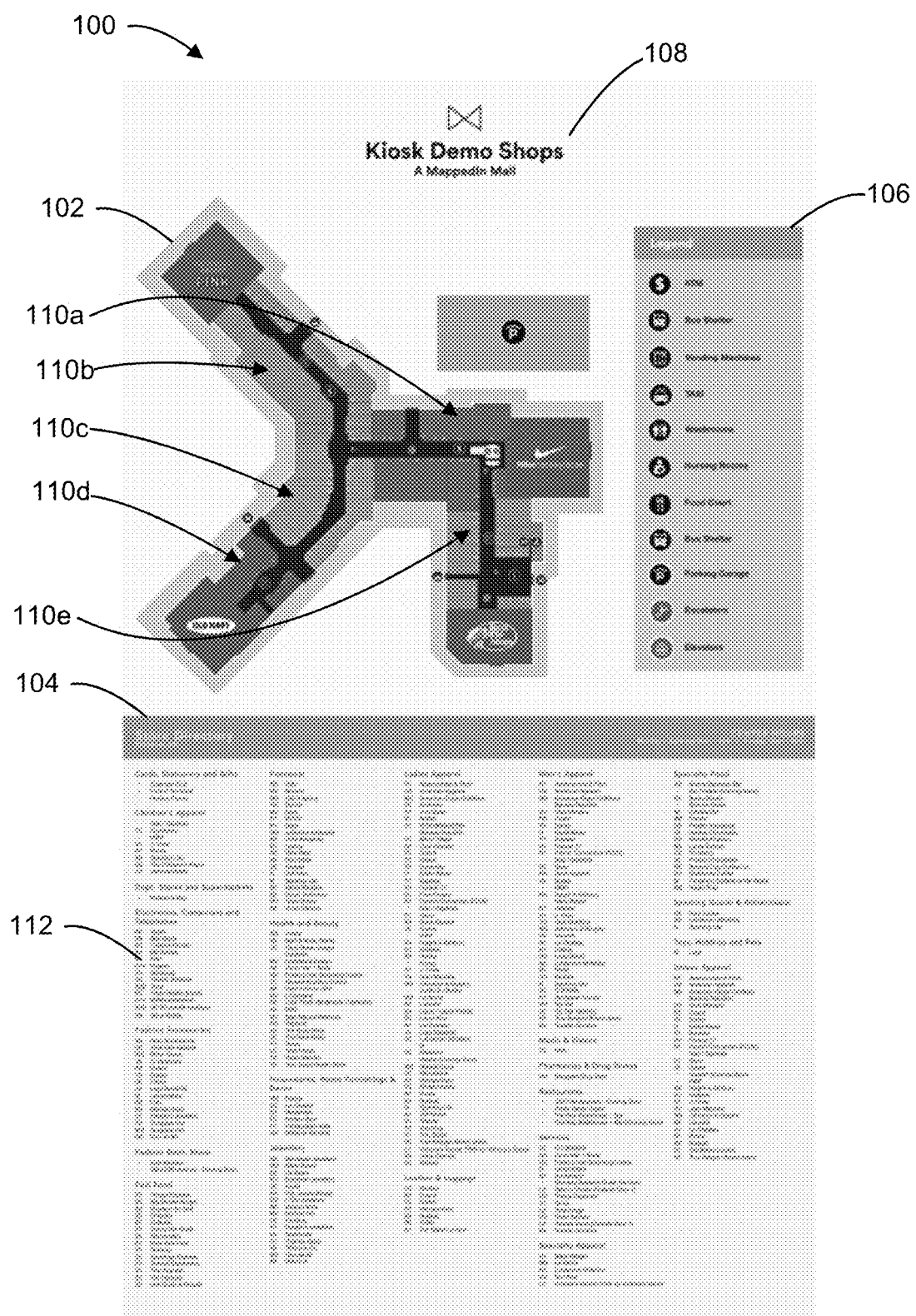
FIG. 3 is an example illustration of a printed, hardcopy map, in accordance with some embodiments.

Referring now to FIG. 3, shown therein is an illustration of a printed, hardcopy map. Printed, hardcopy maps typically show a map for each floor of the facility 102 (i.e., a shopping center or airport), a directory listing of the facility units 104 (i.e., stores), a legend 106 identifying amenities and other information shown on the map, and a descriptor of the facility 108 (i.e., a logo or name of the facility). The hardcopy map typically includes visual indicators for sections or areas within the facility 110a, 110b, 110c, 110d, and 110e (i.e., colors, textures), identifiers for the sections (i.e., numerical or name identifiers), and identifiers for the facility units 112 (i.e., numerical or name identifiers). The visual indicators for sections within the facility 110a, 110b, 110c, 110d, and 110e can be selected based on the color of brands for facility units within those sections.

Figure 13:
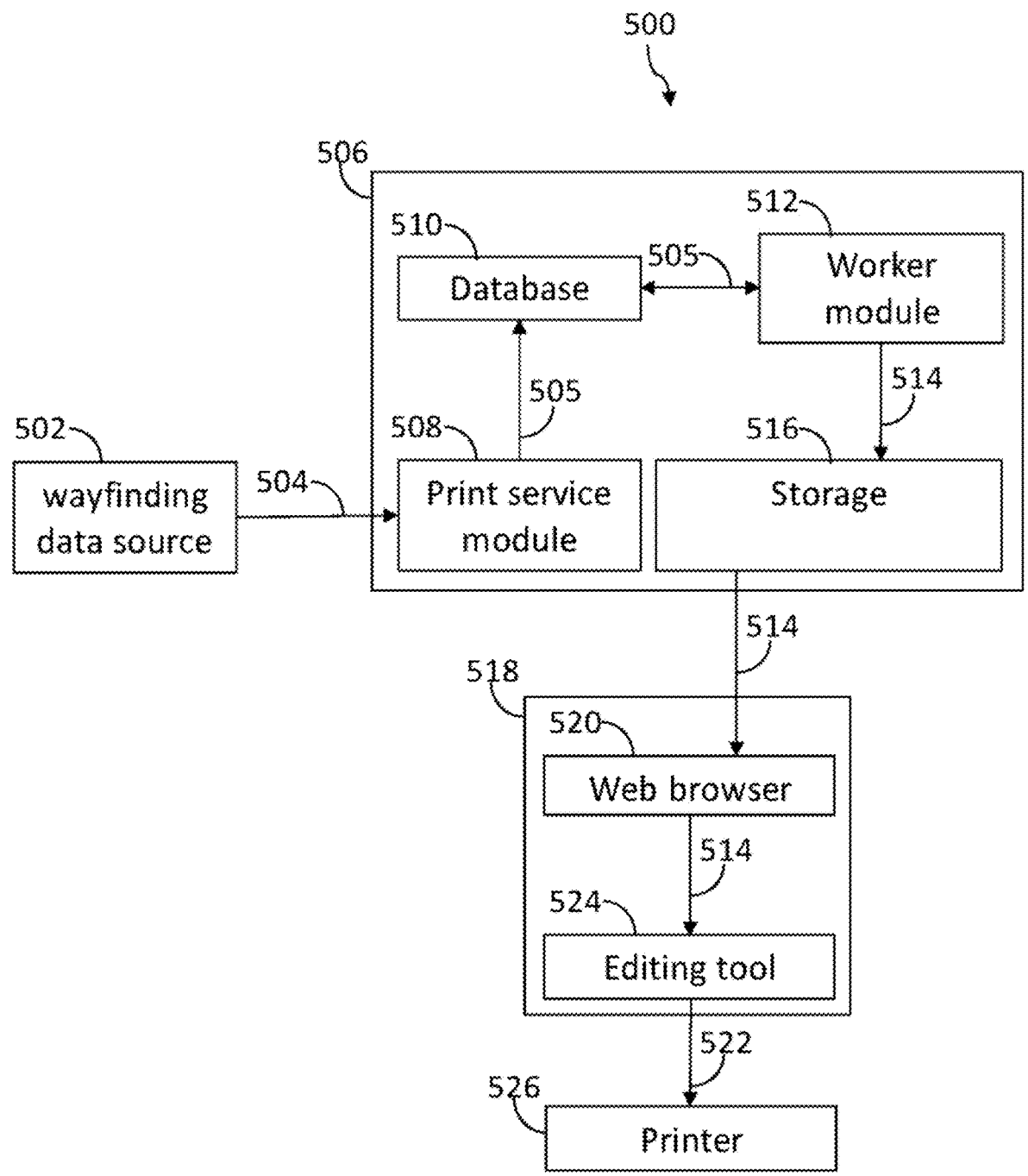
FIG. 13 is a flowchart diagram of a system for making a printed map, in accordance with some embodiments.

Referring to FIG. 13, illustrated therein is a system 500 for making a printed, map of a facility, in accordance with an embodiment. Facility metadata 504 from a wayfinding data source 502 is received at a print server 506. The wayfinding data source 502 may be the server platform 12 in FIGS. 1 and 2. According to another embodiment, the wayfinding data source 502 may be located on the print server 506. The facility metadata 504 includes a plurality of polygons (objects), a plurality of nodes (object locations) and a plurality of identifiers (object identifiers and icons).

The print server 506 includes a print service module 508, a database 510, a worker module 512 and a storage 516. Facility metadata 504 is received by the print service module 508. The print services module 508 formats the facility metadata 504 into polygons and identifier data 505. The polygons and identifier data 505 is stored in the database 510. The database 510 is in communication with the worker module 512. The worker module 512 receives the polygons and identifier data 505.

The worker module 512 generates map data file 514 from the polygons and the identifier data 505. The map data files 514 may include a Portable Document Format (PDF) file (containing a vector map of the facility), a Scalable Vector Graphics (SVG) file (containing a graphical representation of object identifiers) and an Extendable Markup Language (XML) file (containing textual representations of object identifiers). The map data file 514 is saved in the storage 516.

The system 500 may include a device 518 in connection with the server 506. The device 518 may include a user device (such as user device 14, 16, 18 and 22 in FIG. 1), a smartphone or a PDA. The device 518 includes a web browser 520. The web browser 524 can access the web storage 516 of the server 506 to retrieve the map data file 514.

The device 518 includes an editing tool 524 for editing the initial printable map that is saved as the map data file 514. The editing tool 524 may be Adobe Illustrator® or Adobe InDesign® or other suitable application. The editing tool 524 may then generate a final printable map 522.

The system 500 may include a printer 526 for printing a hardcopy map from the final printable map 522.

Figure 4:
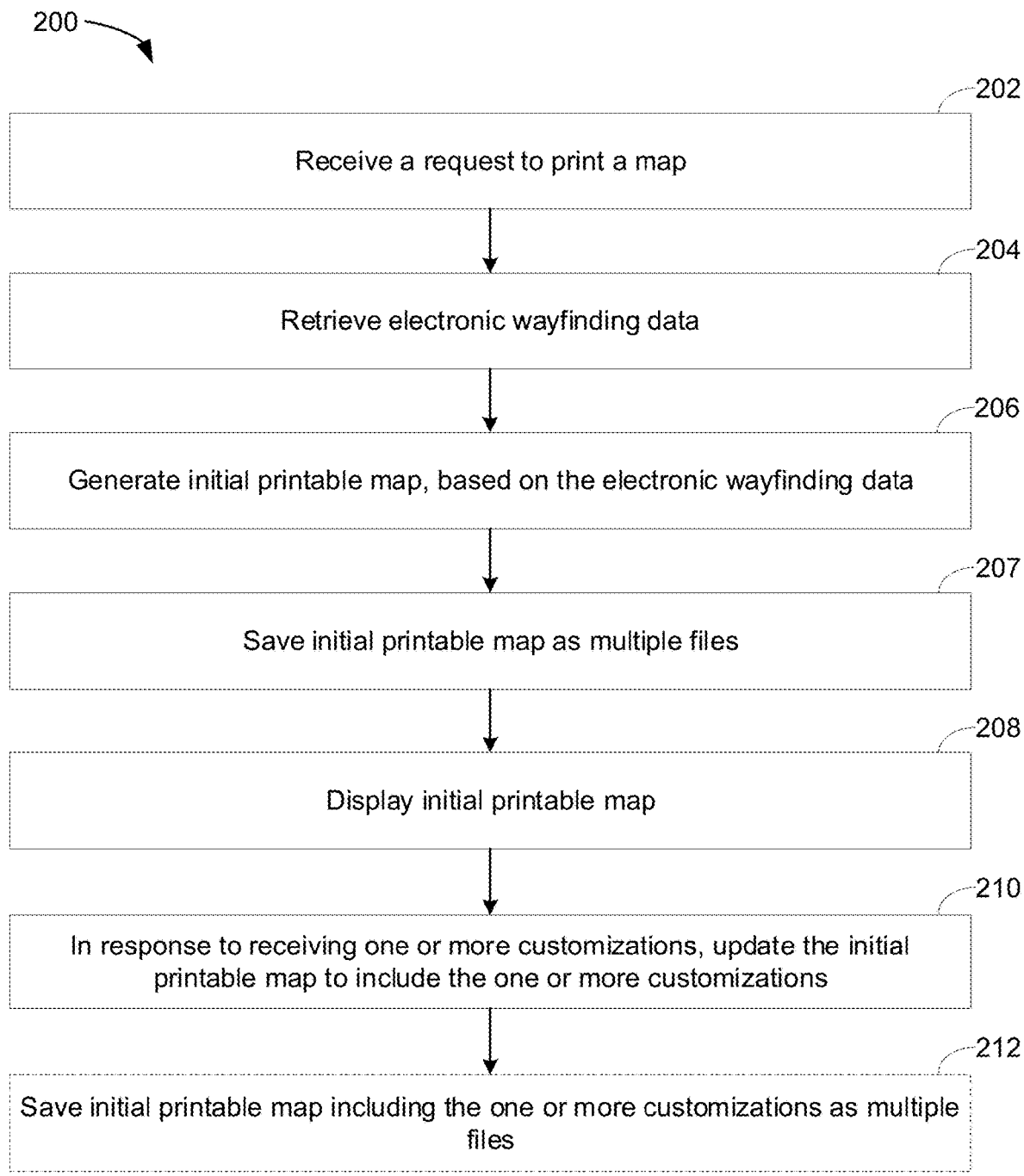
FIG. 4 is a flowchart diagram of an example method for generating a printable map, in accordance with some embodiments.

Referring now to FIG. 4, an example method 200 for generating a printable map is shown in a flowchart diagram.

At 202, a print server receives a request sent by a user device (such as user devices 14, 16, 18 or 22 in FIG. 1 or device 518 in FIG. 13) to print a printable map. The print server may be the print server 11 of FIG. 1 or print server 506 of FIG. 13.

At 204, the print server retrieves a subset of the electronic wayfinding data that is relevant to printable maps from a source. The source may be the server platform 12 in FIGS. 1 and 2. According to another embodiment, the source may be the print server. In particular, the subset of electronic wayfinding data can include the electronic facility maps 36 and facility metadata 38 including facility units, venue categories associated with the facility units, connections (e.g., elevators, escalators, stairs), regions (e.g., atriums, stages, courtyards) and amenities associated nodes (e.g., facility locations).

Figure 5:
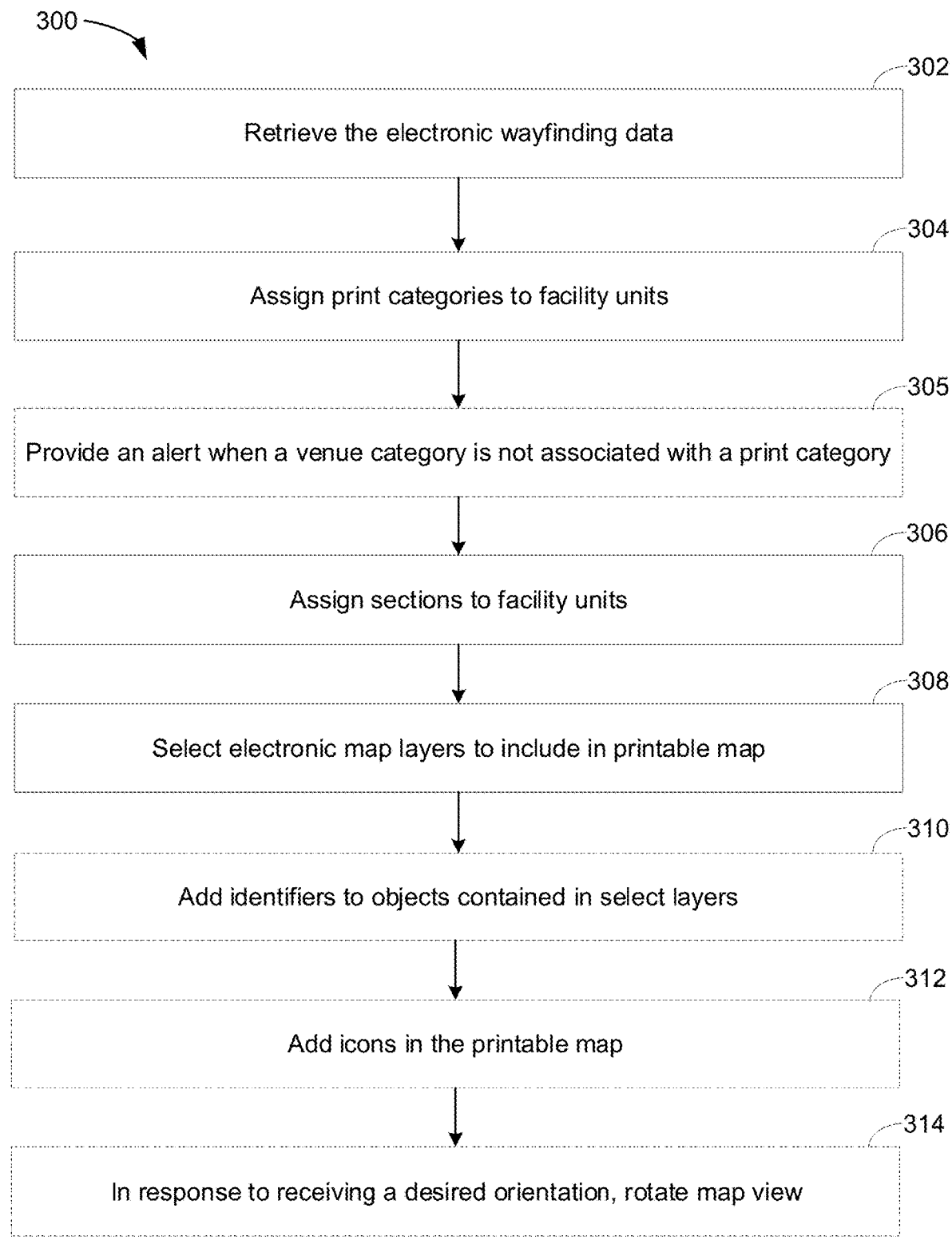
FIG. 5 is a flowchart diagram of an example method for generating an initial printable map based on electronic wayfinding data, in accordance with some embodiments.
Figure 6:
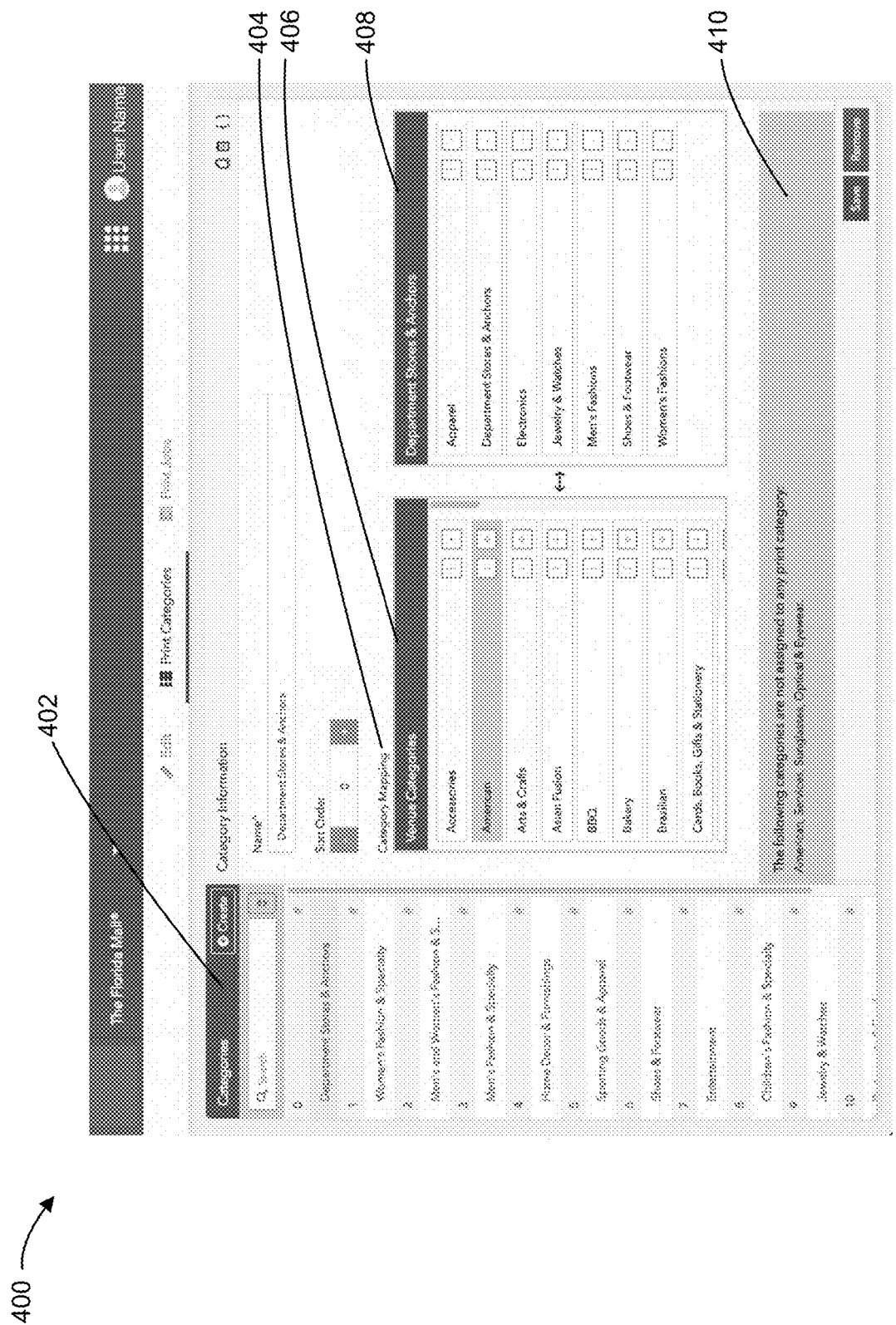
FIG. 6 is an example screen shot of a map editing tool, in accordance with some embodiments.
Figure 7:
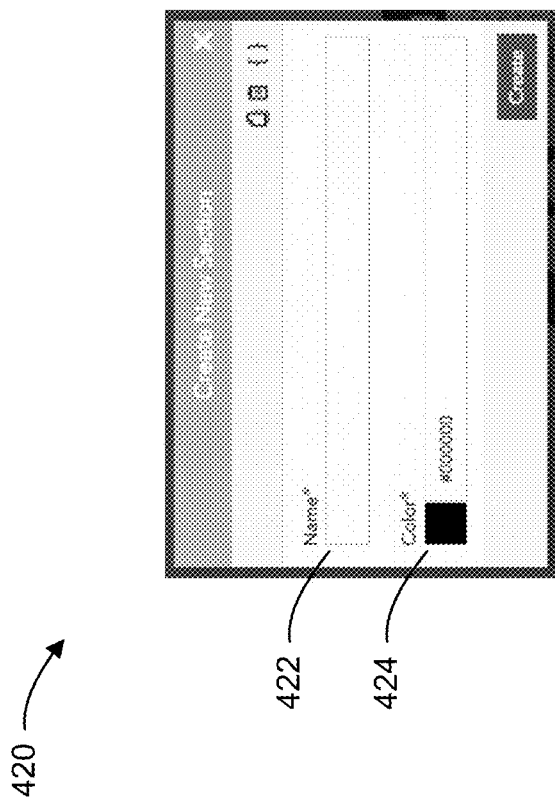
FIG. 7 is another example screen shot of a map editing tool, in accordance with some embodiments.

At 206, the print server generates an initial printable map based on the electronic wayfinding data retrieved at 304. An example method for generating an initial printable map based on electronic wayfinding data is shown in FIG. 5 and is described in more detail below.

In some embodiments, at 207 the initial printable map generated at 206 is saved as multiple files. Multiple files can allow various portions of the printable map to be processed by multiple parties simultaneously. Each of the multiple files may be further processed by the map editing tool or any other appropriate application, such as Adobe Illustrator® or Adobe InDesign®.

For example, the print server can generate an Extendable Markup Language file (XML) file that contains the directory listing of the facility units 104. The directory listing of the facility units 104 can include print categories definitions, the print categories assigned to each of the facility units (304 of method 300 below) and identifiers (310 of method 300 below). The print server can generate a Portable Document Format (PDF) file that contains a vector map of the facility 102. The processor can also generate a Scalable Vector Graphics (SVG) file that contains information related to the annotations, such as identifiers and icons (310 and 312 of method 300 below). That is, the SVG file can relate to a graphical representation of an identifier, including the position and size of the annotation, whereas the XML file can relate to a text representation of the identifier, such as a numerical or name identifier.

At 208, the initial printable map generated at 204 is displayed for viewing by the user. The initial printable map may be displayed on a device (i.e. user devices 14, 16, 18 or 22 in FIG. 1 or device 518 in FIG. 13). The initial printable map can be displayed using the map editing tool (i.e. editing tool 524 in FIG. 13), Adobe Illustrator®, Adobe InDesign®, or any other suitable application.

After viewing the initial printable map in the map editing tool or other appropriate application, a user can provide one or more customizations. The customization can be specific to the printable map. For example, the customization can relate to modifying annotations. The customization can relate to "finishing touches" that improve the look of the printable map.

In response to receiving one or more customizations for the printable map, at 210, the device updates the initial printable map to include the one or more customizations, thereby generating the final printable map. At 212 the final printable map (i.e. the initial printable map including the one or more customizations) may be saved as multiple files.

When a printable map is represented in multiple files, only the respective file is updated. For example, when the customization relates to the annotations, the SVG file can be updated. The SVG file can be edited using applications such as Adobe Illustrator® and/or Adobe InDesign®. The PDF file can be edited using an application such as Adobe Illustrator® and the XML file can be updated using an application such as Adobe InDesign®.

Referring now to FIG. 5, an example method 300 for generating an initial printable map based on electronic wayfinding data is shown in a flowchart diagram. The method 300 may implemented at Act 206 of method 200 in FIG. 4. The method 300 may be performed by the print server 11 of FIG. 1 or the print server 506 of FIG. 13. To assist with the description of the method 300, reference will be made simultaneously to FIGS. 6 to 9.

At 302, the print server retrieves the electronic wayfinding data to be used for generating a printable map.

At 304, a processor (i.e., the processor included in the worker module 512 of the print server 506 in FIG. 13, that can implement instructions from a user) can assign print categories to each of the facility units, based on the venue categories associated with that facility unit. Print categories can be different from venue categories because of the limited space on a printed, hardcopy map. As well, since the user experience with an electronic map is interactive and dynamic, more venue categories may be acceptable. However, since the user experience with a printed, hardcopy map is non-interactive and static, less print categories are typically preferred.

The print server can store pre-determined mappings between print categories and venue categories. As shown in an example screen shot 400 of the map editing tool in FIG. 6, a user can use the map editing tool to create, update, or delete print categories 402 and the mapping between print categories and venue categories. The example screen shot 400 shows the category mapping 404 for the print category "Department Stores & Anchors". Venue categories listed in section 406 are mapped to the print category "Department Stores & Anchors". Venue categories listed in section 408 are mapped to the print category "Department Stores & Anchors".

In some embodiments, the user can create print categories based on the venue categories. At 305, the map editing tool may provide an alert 410 to the user when a venue category does not have a pre-determined mapping to a print category.

Upon receiving facility units and venue categories associated with those facility units, the processor can assign print categories to each of the facility units. The processor can assign multiple facility units to have the same print category. As well, the processor can assign a facility unit to multiple print categories. For example, the processor assigns any facility unit having venue categories listed in section 408 as having the print category "Department Stores & Anchors". In addition, the user does not assign any facility unit having venue categories listed in section 406 as having the print category "Department Stores & Anchors".

The processor can also leave one or more facility units as having an "unassigned" print category based on the venue category. For example, as shown in the screen shot 400, facility units having venue categories such as "America", "Sunglasses", and "Optical & Eyewear" may remain "unassigned" as indicated by alert 410.

At 306, the processor can assign sections to each of the facility units within the electronic facility map 36. Furthermore, since nodes are associated with polygons, sections are also assigned to each node, via the polygon associated with that node. Sections can relate to the geographic location of facility units within the facility. Referring back to FIG. 3, sections 110*a*, 110*b*, 110*c*, 110*d*, and 110*e* are shown in the printed, hardcopy map 400. As shown in an example screen shot 420 of the map editing tool in FIG. 7, a user can use the map editing tool to create sections. Sections can include an identifier 422 (i.e., a name) and a visual indicator 424 (i.e., a color or pattern).

After a section is defined, the user can identify facility units to be assigned to each section. The processor can receive the user selection of facility units and store the section assignment for each facility unit.

At 308, the processor can identify layers of the electronic map 36 to include in the printable map. In most cases, the layers of the electronic map 36, whether it be for web, mobile, or kiosk applications of the electronic wayfinding application are different from layers used for the printable map. Outdoor features and outdoor parking lots may not be included in the printable map. Features relating to tenants, such as stores, and structural features are typically included in the printable map. Furthermore, multiple layers can relate to tenants. A first layer can relate to "anchor" tenants and a second layer can relate to non-anchor tenants.

Figure 8:
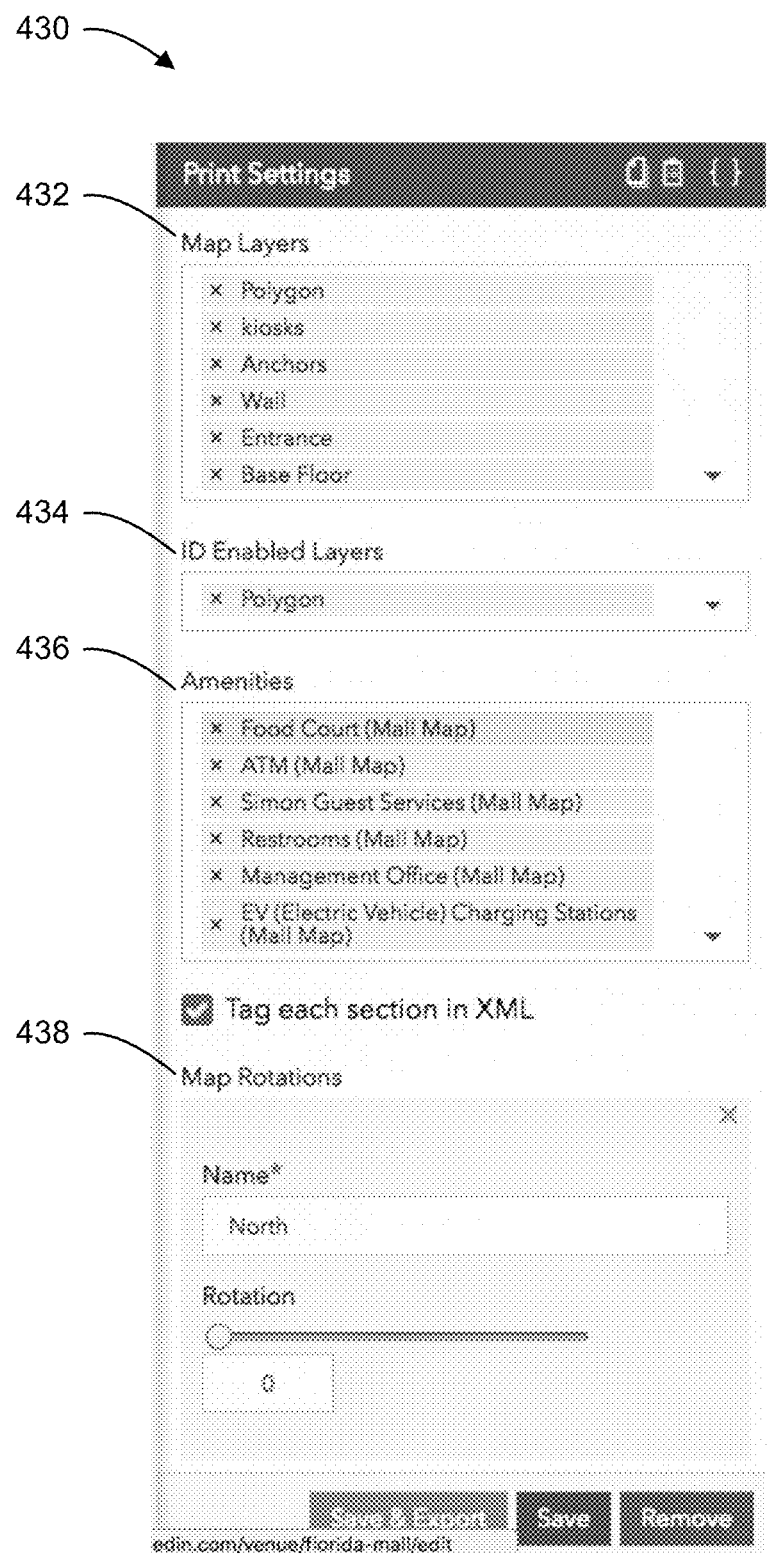
FIG. 8 is an example screen shot of a map editing tool, in accordance with some embodiments.
Figure 9:
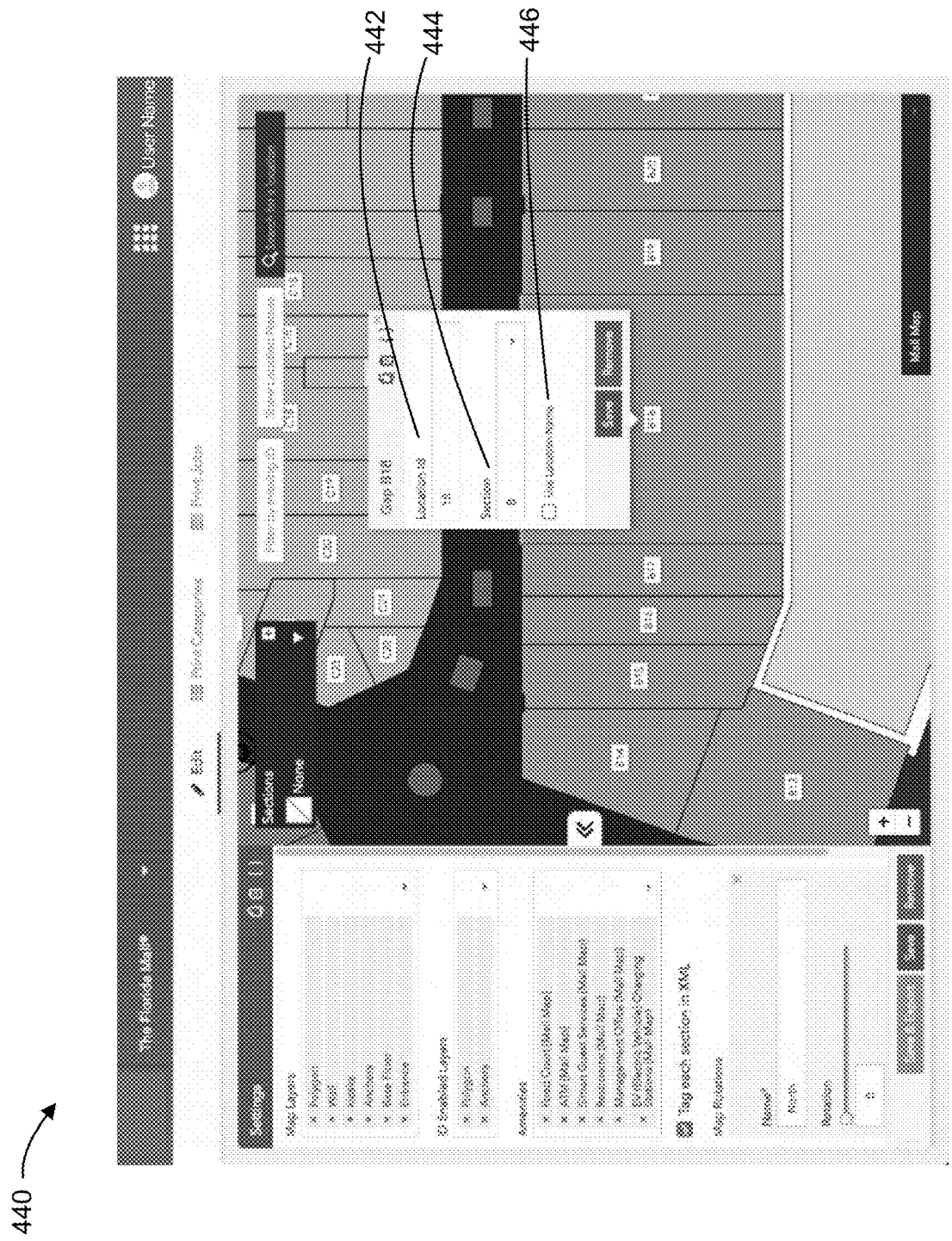
FIG. 9 is another example screen shot of a map editing tool, in accordance with some embodiments.

As shown in an example screen shot 430 of the map editing tool in FIG. 8, a user can use the map editing tool to further modify the layers identified by the processor for inclusion in or exclusion from the printable map. For example, as shown in section 432 of screen shot 430, map layers "polygon", "kiosks", "anchors", "wall", "entrance", and "base floor" have been identified as being included in the printable map.

At 310, the processor can select layers for which to label. The processor can add labels to the printable map for objects contained in the selected layers. As shown in the example screen shot 430 of the map editing tool in FIG. 8, the processor can add labels to objects in the map layer "polygon" (which relates to facility units, or stores) identified in section 434. A user can use the map editing tool to further add or remove the layers selected by the processor for labelling.

The processor can generate identifiers to be placed on the map based on an identifier of the object as well as the section of the object, assigned at 304. For example, as shown in example screen shot 440, the object, or facility unit, has an identifier of "B18" which is a concatenation of the section "B" shown in section 444 and the identifier "18" shown in section 442. A user can use the map editing tool to modify the identifier assigned by the processor in section 442 and the section assigned to the facility unit in section 444.

In some embodiments, the facility units can also be identified using the name of the facility unit (i.e., a store name). In some embodiments, the processor can by default, generate the identifiers based on the section and location identifiers and the user can manually modify individual facility units to be identified with the name of the facility via example section 446 of screen shot 440. In some embodiments, the processor can by default, generate the identifiers based on the store name and a user can manually modify individual facility units to be identified with the section and location identifiers.

In some embodiments, the processor can generate some identifiers based on the store name and some identifiers based on the section and location identifiers. The processor can determine whether data associated with a facility unit satisfies various criteria and generate identifiers based on whether the various criteria are satisfied. By assessing various criteria, the processor can generate different identifiers for facility units for commercial reasons or to improve the user experience (i.e., areas of greater interest).

For example, the processor can determine whether the physical size of a facility unit is greater than a pre-defined physical size threshold. If the physical size of a facility is greater than the pre-determined physical size threshold, then the processor can generate an identifier based on the store name of the facility unit. If the physical size of the facility is less than the pre-determined physical size threshold, then the processor can generate an identifier based on the section and location identifier.

In another example, the processor can determine whether the physical location of a facility unit is within a location that has been pre-identified as being a special area of the facility. Areas can be special for any number of reasons, including but not limited to being confusing areas, popular areas, heavy-traffic areas, special event areas. A location can be manually pre-identified and stored in the electronic wayfinding data as being a special area within the facility or automatically determined by the wayfinding system 10 based on wayfinding usage. If the physical location of a facility is within a special area of the facility, then the processor can generate an identifier based on the store name of the facility unit. If the physical location of a facility is not within a special area of the facility, then the processor can generate an identifier based on the section and location identifier.

In another example, the processor can determine whether the date of a last update to facility unit data is within a pre-defined date range. If the date of the last update to facility data is within the pre-defined date range, then the processor can generate an identifier based on the store name of the facility unit. If the date of the last update to facility data is within the pre-defined date range, then the processor can generate an identifier based on the section and location identifier. The pre-defined date range can relate to the last month, or last two months, or any appropriate date range. In this manner, the processor can generate a different identifier for new (incoming) or relocated stores.

The processor can also compute a position for the identifier and a font size for the identifier so that the identifier fits within the polygon representing the facility unit in the printable map. In some cases, the identifier may not fit within the polygon. That is, the font size required for the identifier to fit within the polygon is too small to be legible on the printed, hardcopy map. That is, the print server can determine that the font size required for the identifier to fit within the polygon is less than a pre-determined minimum font threshold.

In some embodiments, the processor can flag such identifiers for the user to modify by making the identifier a "call out" identifier. In some embodiments, the processor can automatically convert identifiers to be call out identifiers without user input. Call out identifiers are identifiers that are not located within the polygon. Instead, they are located outside of the polygon and a lead line can be provided to show the relationship between the polygon and the identifier. In some embodiments, the processor can also position, size, or call out identifiers to ensure that they do not overlap with other identifiers on the printable map.

At 312, the processor can add icons in the printable maps. Icons can relate to for amenities, connections, regions, and facility units. The processor can identify amenities, connections, regions, and facility units of the electronic map 36 for which icons can be included in the printable map.

Returning to the example screen shot 430 of the map editing tool in FIG. 8, a user can use the map editing tool to further modify the amenities identified by the processor for inclusion with an icon or exclusion from the printable map. For example, as shown in section 436 of screen shot 430, amenities "Food court", "ATM", "Guest Services", "Restrooms", "Management Office", and "Electric Vehicle Charging Stations" have been identified as being included in the printable map. Other example amenities include, but are not limited to, wheelchair and/or stroller rentals, nursing rooms, valet parking, parking garages, transit stops, bus shelters, taxi loading areas, vending machines, electronic device charging stations, smoking areas, and drinking fountains.

Example connections to include with an icon are elevators, escalators, and stairs.

Example regions to include with an icon are atriums, stages, concourse, public squares, and courtyards.

Example facility units to include with an icon are anchor tenants, which may be located within an anchor tenant layer.

Similar to identifiers, the processor can compute a position for the icons and a size for the icon. Amenities and connections can be associated with nodes within the facility. Accordingly, the processor can select the node location of the amenity or connection as the position for the icon representing that amenity or connection. If an icon overlaps with identifiers or other icons, the print server can call out the identifier or icons.

At 314, the processor can receive a desired orientation for the printable map. The desired orientation can be provided by a user via the map editing tool. The desired orientation can include any angle of rotation from 0° to 360°. The processor can also a store a name for the desired orientation for future use.

In response to receiving a desired orientation for the printable map, the processor can rotate the view of the facility within the printable map to match that of the desired orientation. Rotating the view of the facility can include the processor adjusting position, size, and callout of annotations (i.e., identifiers and amenity icons).

Figure 10:
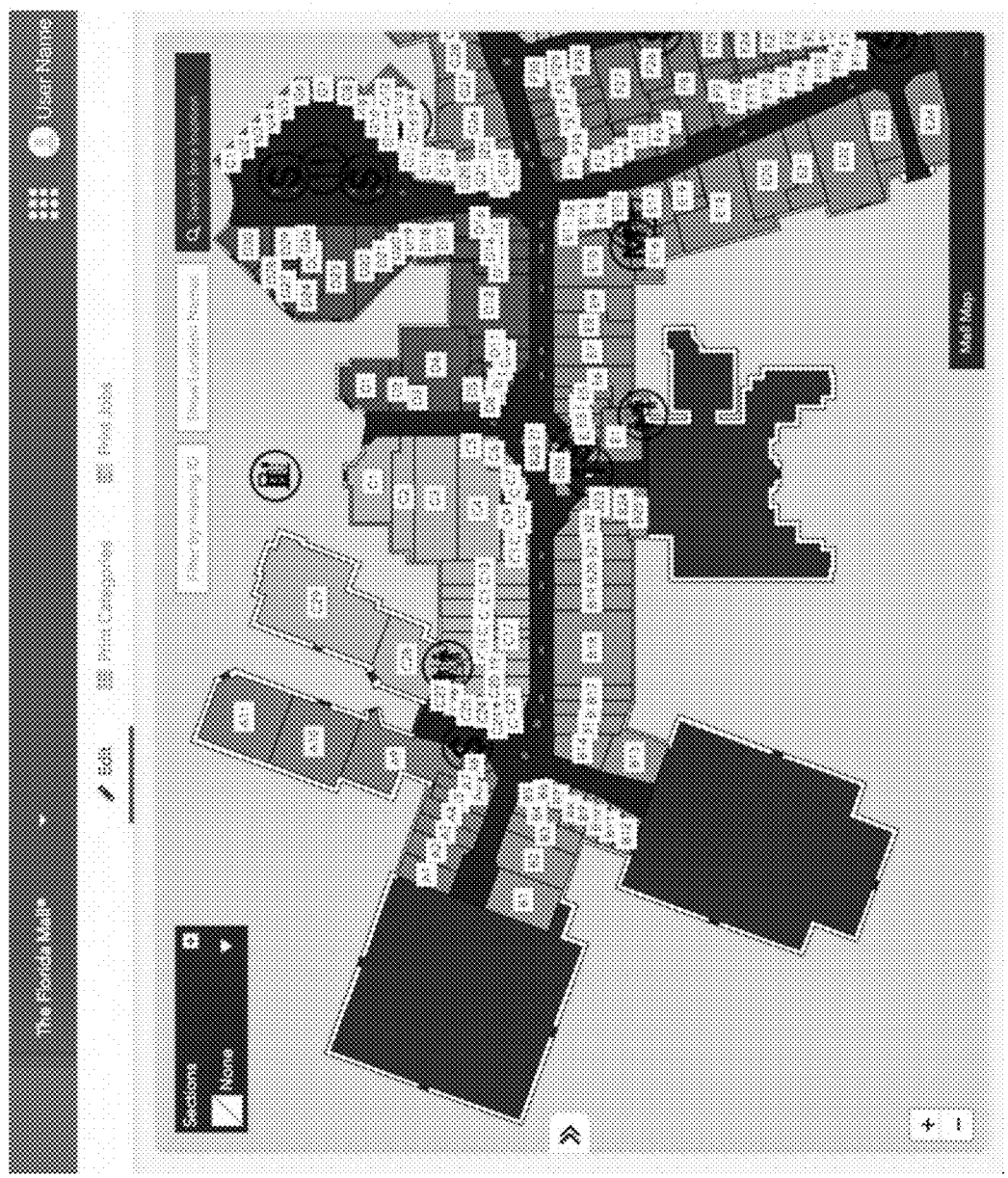
FIG. 10 is an example screen shot of a map editing tool, in accordance with some embodiments.

The map editing tool can also be configured to display the printable map. A user may wish to view the printable map, including annotations, so that any adjustments or corrections can be made prior to printing. FIG. 10 shows an example screen shot 450 of a printable map.

Figure 11:
FIG. 11 is another example screen shot of a map editing tool, in accordance with some embodiments.

The map editing tool can also display a listing of the printable map generations. As shown in example screen shot 460 of FIG. 11, the map editing tool can archive each of the previous printable maps that have been generated and the previous printable maps can remain available for download.

The processor can be configured to track changes in the electronic wayfinding data between printable map generations and the map editing tool can display such changes. In order track the changes to the electronic wayfinding data, the wayfinding system 10 can archive (i.e., take a snapshot of) portions of the electronic wayfinding data when it receives a request to generate a printable map. When a subsequent request to generate a printable map is received, current portions of the electronic wayfinding data is compared with the archive (i.e., a most recent snapshot) to determine the difference.

For example, the processor can archive the position and size of polygons and nodes. A change to a node position can indicate a relocation of the amenity or connection located at that node. A change to a polygon position can indicate a relocation of the facility unit or region represented by that polygon. A change to the size of a polygon can indicate an expansion of the facility unit or region.

Figure 12:
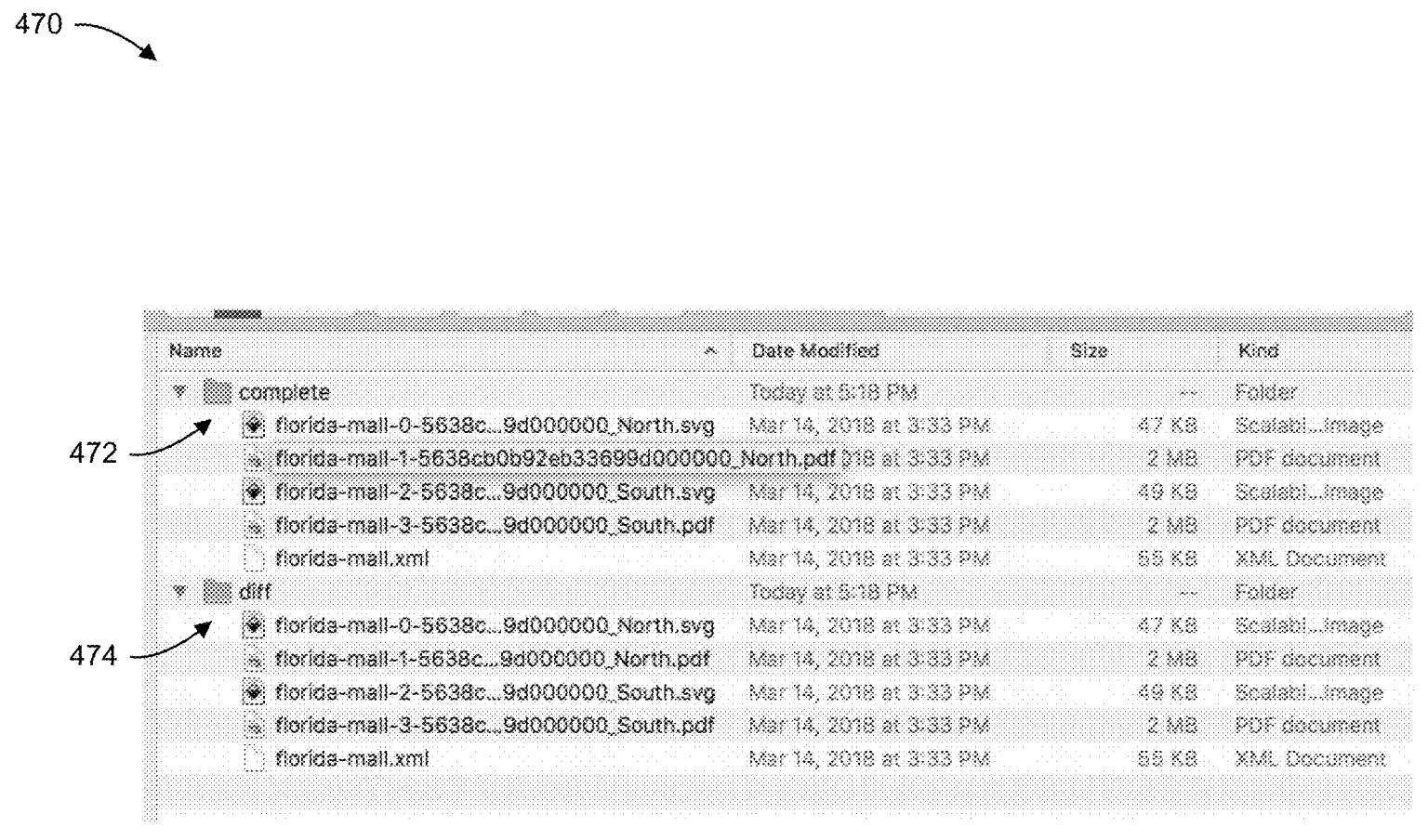

To display such changes, that is changes to the electronic wayfinding data, the processor can generate a "difference" printable map that illustrates such changes. In some embodiments, the processor can generate a "difference" printable map that omits portions of the printable map that have not changed from the previous printable map. For example, the difference printable map can mark the portions that have been added (for example, a first box color, a first font color, underlined text, highlighted text) and distinctly mark the portions that have been removed (for example, a second box color, a second font color, struck-through text). Alternatively, the processor can include portions of the printable map that have not changed. That is, the processor can generate a difference printable map that marks the portions that have been changed for example, a first box color, a first font color, underlined text, highlighted text) and distinctly mark the portions that have not changed (for example, a second box color, a second font color, non-underlined, non-highlighted, and non-struck-through text). As shown in example screen shot 470 of FIG. 12, the difference printable map 474 can be a separate set of files from that of the printable map 472 (i.e., the "complete" printable map).

The map editing tool can display such changes in the preview using the difference printable map 474.

Referring again to FIG. 4, in some cases, the method 200 can involve a plurality of printable map customizations at 210. In such cases, a user may determine that the changes to the printable map as a result of changes to the electronic wayfinding data since the last printable map was generated is less than the changes to the printable map as a result of the plurality of printable map customizations. Accordingly, the user may prefer to reuse the last printable map (i.e. the printable map saved at 212) and augment the last printable map with the changes to the electronic wayfinding data.

The systems and methods of generating a printable map disclosed herein can reduce the volume of manual effort in generating each printable map, particularly, mark-ups to drawings, which can also improve the accuracy of the printable map. In addition, the systems and methods of generating a printable map disclosed herein allow for a printable map to be generated in a much shorter timeframe.

While the above description provides examples of one or more apparatus, methods, or systems, it will be appreciated that other apparatus, methods, or systems may be within the scope of the claims as interpreted by one of skill in the art.

The invention claimed is:

1. A system for generating a printable map of a facility, the system comprising:
   a print service module having a plurality of wayfinding data;
   a database for storing the plurality of wayfinding data;
   a worker module for generating an initial printable map based on the plurality of wayfinding data; and
   a storage for storing the initial printable map, wherein the storage is connected to the worker module;
   wherein the initial printable map is generated as a plurality of data files, wherein the plurality of data files includes:
   a Portable Document Format (PDF) file, wherein the PDF file contains a vector map of the facility;
   a Scalable Vector Graphics (SVG) file, wherein the SVG file contains graphical representations of the plurality of identifiers; and
   an Extendable Markup Language (XML) file, wherein the XML file contains textual representations of the plurality of identifiers.

2. The system of claim 1, wherein the system provides the initial printable map to a device, the device comprising:
   a web browser for downloading the initial printable map from the storage; and
   an editing tool for editing the initial printable map to generate a final printable map, wherein the editing tool receives the initial printable map downloaded by the web browser.

3. The system of claim 2 further comprising a printer for printing the final printable map.

4. The system of claim 2, wherein the final printable map includes any one or more of the facility, a directory listing of a plurality of facility units in the facility, a legend listing features shown on the final printable map, a plurality of unit identifiers, wherein each identifier corresponds to one facility unit in the facility, a plurality of visual indicators, wherein each visual indicator corresponds to one section of the facility, a plurality of amenity identifiers, wherein each amenity identifier corresponds to one amenity in the facility, a descriptor of the facility, and at least one route.

5. The system of claim 1, wherein the plurality of wayfinding data includes any one or more of at least one facility map of the facility; and a plurality of facility metadata.

6. The system of claim 5, wherein the plurality of facility metadata includes a plurality of polygons, wherein each polygon corresponds to one object in the facility, the plurality of polygons including any one or more of:

a subset of unit polygons, wherein each unit polygon defines the boundary of one facility unit in the facility;
a subset of section polygons, wherein each section polygon defines the boundary of one section in the facility; and
a subset of obstruction polygons, wherein each obstruction polygon defines the boundary of one obstruction in the facility.

7. The system of claim 5, wherein the plurality of facility metadata includes a plurality of nodes, wherein each node corresponds to one location in the facility, the plurality of nodes including any one or more of:
a subset of unit nodes, wherein each unit node defines the location of one facility unit in the facility;
a subset of amenity nodes, wherein each amenity node defines the location of one amenity in the facility;
a subset of section nodes, wherein each section node defines the location of one section in the facility;
a subset of obstruction nodes, wherein each obstruction node defines the location of one obstruction in the facility;
a subset of connection nodes, wherein each connection node defines the location of one connection in the facility; and
a subset of region nodes, wherein each region node defines the location of one region in the facility.

8. The system of claim 5, wherein the plurality of facility metadata includes a plurality of identifiers, wherein each identifier corresponds to one object in the facility, the plurality of identifiers including any one or more of:
a subset of unit identifiers, wherein each unit identifier corresponds to one facility unit in the facility;
a subset of amenity identifiers, wherein each amenity identifier corresponds to one amenity in the facility;
a subset of section identifiers, wherein each section identifier corresponds to one section in the facility;
a subset of connection identifiers, wherein each connection identifier corresponds to one connection in the facility; and
a subset of region identifiers, wherein each region identifier corresponds to on region in the facility.

9. A method for generating a printable map of a facility, the method comprising:
receiving a request sent by a device at a print server;
retrieving electronic wayfinding data by the print server;
generating an initial printable map based on the electronic wayfinding data;
saving the initial printable map as a plurality of files;
displaying the initial printable map on the device;
receiving one or more customizations entered on the device by a user; and
updating the initial printable map to include the one or more customizations:
wherein the plurality of files comprises:
a Portable Document Format (PDF) file, wherein the PDF file contains a vector map of the facility;
a Scalable Vector Graphics (SVG) file, wherein the SVG file contains graphical representations of a plurality of identifiers; and
an Extendable Markup Language (XML) file, wherein the XML file contains textual representations of the plurality of identifiers.

10. The method of claim 9, wherein the electronic wayfinding data includes at least one facility map of the facility; and a plurality of facility metadata.

11. The method of claim 9, wherein the one or more customizations comprise annotating a plurality of identifiers, wherein the plurality of identifiers is a subset of the electronic wayfinding data.

12. The method of claim 9, further comprising saving the initial printable map including one or more customizations as a plurality of files.

13. A method for generating a printable map of a facility, the method comprising:
receiving a request sent by a device at a print server;
retrieving electronic wayfinding data by the print server;
generating an initial printable map based on the electronic wayfinding data;
saving the initial printable map as a plurality of files;
displaying the initial printable map on the device;
receiving one or more customizations entered on the device by a user; and
updating the initial printable map to include the one or more customizations;
wherein generating an initial printable map based on the electronic wayfinding data comprises:
assigning print categories to a plurality of facility units, wherein each facility unit is assigned to at least one print category as selected by the user for each facility unit;
assigning sections to the plurality of facility units, wherein each facility unit is assigned to one section according to the location of the facility unit within the facility; and
selecting electronic map layers to include in the initial printable map, wherein each electronic map layer corresponds to a subset of objects in the facility.

14. The method of claim 13 further comprising:
adding identifiers to objects contained in the selected electronic map layers in the initial printable map; and
adding icons to the initial printable map, wherein each icon corresponds to one object of the subset of objects.

15. The method of claim 13 further comprising rotating the initial printable map in response to receiving a desired orientation.

16. The method of claim 13, wherein print categories are pre-assigned groupings of facility units according to the nature of the facility units.

17. The method of claim 13, further comprising:
associating print categories with venue categories, wherein each print category is associated with at least one pre-assigned venue category; and
alerting the user when the venue category does not have a pre-assigned mapping to a print category.

18. The method of claim 13, wherein venue categories are pre-assigned groupings of facility units according to the nature of the facility units.

19. The method of claim 13, wherein the electronic wayfinding data includes at least one facility map of the facility; and a plurality of facility metadata.

20. The method of claim 13, wherein the one or more customizations comprise annotating a plurality of identifiers, wherein the plurality of identifiers is a subset of the electronic wayfinding data.

21. The method of claim 13, further comprising saving the initial printable map including one or more customizations as a plurality of files.

22. A system for generating a printable map of a facility, the system comprising:
a print service module having a plurality of wayfinding data;
a database for storing the plurality of wayfinding data;

a worker module for generating an initial printable map based on the plurality of wayfinding data; and a storage for storing the initial printable map, wherein the storage is connected to the worker module;

wherein generating an initial printable map based on the plurality of wayfinding data comprises:

assigning print categories to a plurality of facility units, wherein each facility unit is assigned to at least one print category as selected by the user for each facility unit;

assigning sections to the plurality of facility units, wherein each facility unit is assigned to one section according to the location of the facility unit within the facility; and selecting electronic map layers to include in the initial printable map, wherein each electronic map layer corresponds to a subset of objects in the facility.

23. The system of claim 22, wherein the system provides the initial printable map to a device, the device comprising:

a web browser for downloading the initial printable map from the storage; and an editing tool for editing the initial printable map to generate a final printable map, wherein the editing tool receives the initial printable map downloaded by the web browser.

24. The system of claim 23 further comprising a printer for printing the final printable map.

25. The system of claim 23, wherein the final printable map includes any one or more of the facility, a directory listing of a plurality of facility units in the facility, a legend listing features shown on the final printable map, a plurality of unit identifiers, wherein each identifier corresponds to one facility unit in the facility, a plurality of visual indicators, wherein each visual indicator corresponds to one section of the facility, a plurality of amenity identifiers, wherein each amenity identifier corresponds to one amenity in the facility, a descriptor of the facility, and at least one route.

26. The system of claim 22, wherein the plurality of wayfinding data includes any one or more of at least one facility map of the facility; and a plurality of facility metadata.

27. The system of claim 26, wherein the plurality of facility metadata includes a plurality of polygons, wherein each polygon corresponds to one object in the facility, the plurality of polygons including any one or more of:

a subset of unit polygons, wherein each unit polygon defines the boundary of one facility unit in the facility;

a subset of section polygons, wherein each section polygon defines the boundary of one section in the facility; and a subset of obstruction polygons, wherein each obstruction polygon defines the boundary of one obstruction in the facility.

28. The system of claim 26, wherein the plurality of facility metadata includes a plurality of nodes, wherein each node corresponds to one location in the facility, the plurality of nodes including any one or more of:

a subset of unit nodes, wherein each unit node defines the location of one facility unit in the facility;

a subset of amenity nodes, wherein each amenity node defines the location of one amenity in the facility;

a subset of section nodes, wherein each section node defines the location of one section in the facility;

a subset of obstruction nodes, wherein each obstruction node defines the location of one obstruction in the facility;

a subset of connection nodes, wherein each connection node defines the location of one connection in the facility; and a subset of region nodes, wherein each region node defines the location of one region in the facility.

29. The system of claim 26, wherein the plurality of facility metadata includes a plurality of identifiers, wherein each identifier corresponds to one object in the facility, the plurality of identifiers including any one or more of:

a subset of unit identifiers, wherein each unit identifier corresponds to one facility unit in the facility;

a subset of amenity identifiers, wherein each amenity identifier corresponds to one amenity in the facility;

a subset of section identifiers, wherein each section identifier corresponds to one section in the facility;

a subset of connection identifiers, wherein each connection identifier corresponds to one connection in the facility; and a subset of region identifiers, wherein each region identifier corresponds to on region in the facility.

30. The system of claim 22, wherein the plurality of data files includes:

a Portable Document Format (PDF) file, wherein the PDF file contains a vector map of the facility;

a Scalable Vector Graphics (SVG) file, wherein the SVG file contains graphical representations of the plurality of identifiers; and an Extendable Markup Language (XML) file, wherein the XML file contains textual representations of the plurality of identifiers.

* * * * *